March 20, 1951 L. W. HATFIELD 2,545,733
CHILD'S HOT FOOD DISH
Filed Nov. 30, 1948
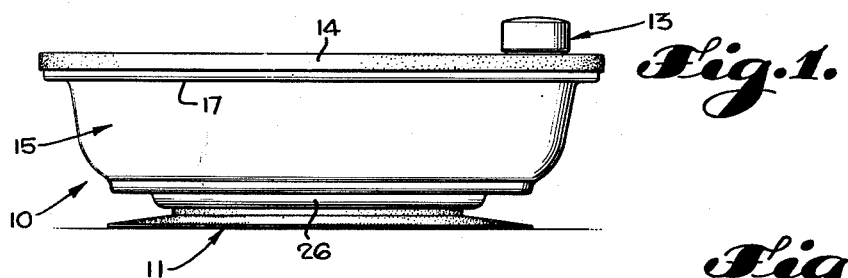
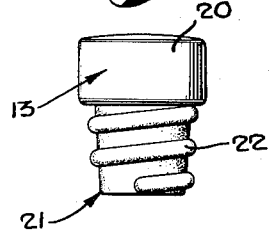
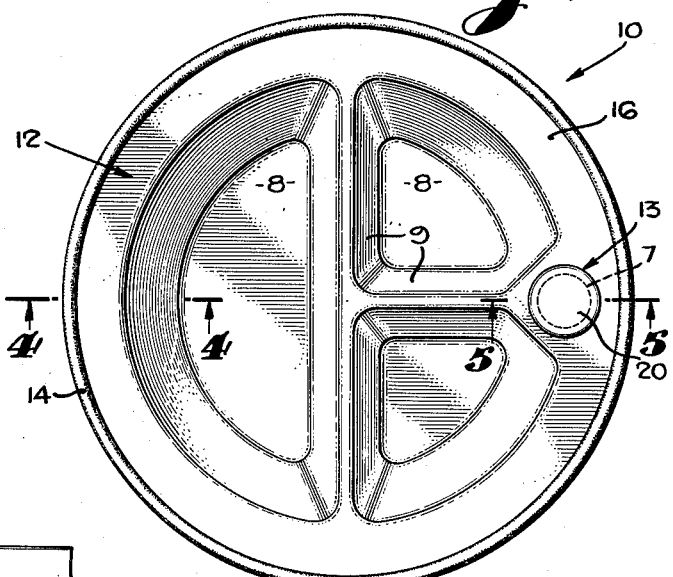
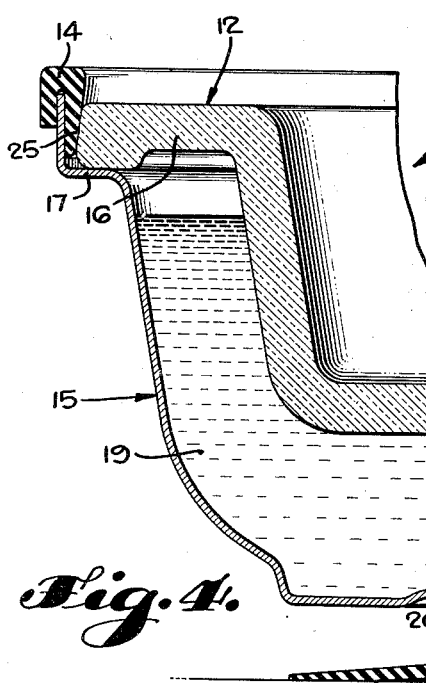
LORAN W. HATFIELD,
INVENTOR.
BY
Robert O. Fulwider
ATTORNEY Patented Mar. 20, 1951

2,545,733

UNITED STATES PATENT OFFICE 2,545,733

CHILD'S HOT FOOD DISH

Loran W. Hatfield, Los Angeles, Calif., assignor to Edgar A. Elkins, Los Angeles, Calif.

Application November 30, 1948, Serial No. 62,757

6 Claims. (Cl. 65—15)

The present invention relates generally to dishes for feeding young children, and more particularly to such dishes which are adapted to keep the food warm during the time that it is being consumed. Young children, when learning to feed themselves, usually take an inordinately long time to finish their meal, and as a consequence, originally hot food is often cold before the meal is finished.

To prevent this, it is a common practice to incorporate in children's feeding dishes, means for keeping the food warm for a considerable length of time. Such means usually consist in an inner, more or less conventional, dish to which is attached an outer jacket member which is spaced from the inner dish to leave an enclosed space surrounding the food dish. This space is then filled with hot water when the child is served, which keeps the food warm for the considerable length of time which the youngster takes in consuming his serving.

Hot food dishes of the class just described have often been made with a ceramic inner dish or food container, and a spun or stamped metal jacket. One difficulty which often arises is in the means used to attach the jacket to the inner dish. In such utensils heretofore available, the two members are usually joined at the outer rim of the food container, all other parts of the two containers being spaced apart to form the hot water jacket.

The joint between the outer jacket and the food container must, of course, be water-tight to prevent water from escaping from the jacket. The aforesaid joint can be made water-tight by cementing the dish and jacket together, but this is a time-consuming assembly procedure, besides which, should it be necessary to replace the dish due to chipping, it is difficult if not impossible, to remove the broken dish from the jacket. Furthermore, the differences in coefficient of thermal expansion of the ceramic inner dish as compared with the metal jacket often result in cracking any cement or glue used to hold these parts together.

Another problem encountered in the type of construction above described is in the design of the opening through which the water is poured into the jacket, and the closure for this opening. The water-filling opening is often made in a flange of the inner dish and must, of course, be provided with a water-tight closure. Such a closure is usually provided in the form of a cork which is forced into the opening of the dish. When new, a cork of this type will serve the desired purpose, but after some use, the cork becomes hardened, and as a consequence, loose in the opening, thereafter allowing water to escape from the jacket. Furthermore, if the closure is not secure, the child can remove the same and following the natural inclination of children to experiment, will often either dump out the water or worse yet, put food into the jacket from which it is difficult to remove.

Bearing in mind the foregoing discussion, it is a major object of the present invention to provide a child's feeding dish of the type having a hot-water jacket which dish may be readily disassembled for replacement of either the jacket or the inner food container.

It is another object of the present invention to provide in a dish of the class described a closure for the water-filling opening, which closure is adapted to remain securely in place, can be removed without the aid of special tools or the like, and which does not deteriorate with age and become loose in the opening.

Still another object of the present invention is to provide a utensil of the class described which is simple, relatively inexpensive to manufacture, and readily assembled without the aid of cement, glue, or other attachment means.

In addition to the above described objects and advantages, the food dish described herein incorporates certain features of the feeding dish described in my copending application Serial No. 755,504, filed June 18, 1947, and entitled Child's Feeding Dish, which has become abandoned.

For a more detailed description of a dish embodying my invention, from which description the foregoing and additional objects and advantages will appear, reference should now be had to the attached drawings in which:

Figure 1 is a side elevational view of a child's hot food dish incorporating the present invention;

Figure 2 is a plan view of the utensil illustrated in Figure 1;

Figure 3 is an enlarged elevational view of a closure member employed in the construction shown in Figures 1 and 2;

Figure 4 is an enlarged elevational section taken on the line 4—4 in Figure 2; and Figure 5 is an enlarged elevational section taken on the line 5—5 in Figure 2.

In the drawings, I have identified the entire utensil or dish by the reference character 10, and the closure member by the reference character 13. The dish 10 comprises an inner food container 12 of glazed porcelain or similar ceramic material, an outer jacket 15 of spun aluminum, stainless steel or similar corrosion-resistant metal, a resilient retaining gasket 14 which serves as securing means for holding the food container 12 and the jacket 15 together, and a non-skid, non-tip, suction cup base member 11.

The food container 12 comprises a relatively deep food receptacle 8, separated by division walls 9 into several compartments, as is customary with children's dishes, and an outwardly extending horizontal flange 16 having a water-filling opening 7 therein, normally closed by the closure member 13.

The jacket is formed as a bowl having sloping sides shouldered adjacent the top as indicated at 17, and having a substantially vertical top edge portion. A bezel-like retaining ring 26 is concentrically secured to the bottom of the bowl by spot welding, brazing, or other suitable means. The purpose of the ring 26 is to removably secure the base member 11 to the bottom of the bowl 15.

The food container 12 and the bowl 15 are held together by a gasket ring 14 which may be a molded ring or extrusion of relatively soft rubber-like material, preferably synthetic rubber, in order to resist the action of soap or grease. The gasket 14 has, as will be seen in Figure 4, an inverted U-shaped cross section, and straddles the upper edge of the bowl 15. It will be seen from an examination of Figure 4 that the surface of the inner arm of the gasket 14 is slightly tapered, and that the outer periphery of the food container flange 16 is complementally tapered, as indicated by the reference character 25. It will be noted that the direction of this taper is such as to retain the food container 12 in the bowl 15 once it has been pressed thereinto, and to urge the same downwardly against the shoulder 17.

Thus it will be seen that the jacket 15 and the container 12 are easily and quickly assembled by merely placing the gasket 14 in the position illustrated in Figure 4, dropping the container in place, and pressing downwardly on the flange 16 to seat it against the shoulder 17. When the container 12 is pressed downwardly in this manner, the material of the gasket 14 deforms temporarily to permit the container 12 to move downwardly into position. Once the container 12 is in position, as illustrated in Figure 4, the gasket 14 springs back, securely retaining it in place and providing a water-tight joint at 25.

Relative thermal expansion and contraction of the jacket and container 12 is taken up by increase and decrease in the degree of compression of the gasket 14 without destroying the efficacy of the water-tight joint.

The water-filling opening, by which water is introduced into the space 19 between the container 12 and the jacket 15, is formed in the flange 16, as indicated by the reference character 7 in Figure 2. The opening 7 is flared inwardly, as illustrated in Figure 5.

The closure member 13 comprises a hollow body 21 of resilient material similar to that of the gasket 14. The upper portion of the body 21 is sheathed with a metal cap 20, and the lower portion is tapered, as best seen in Figures 3 and 5. On the exterior of the lower tapered body portion 21 is a helical thread 22, molded integrally with the body 21.

Thus, it will be seen that by inserting the lower end of the body 21 into the opening 7, and rotating the closure member 13 by means of the cap 20, the closure 13 may be screwed securely into place. The hollow interior 24 of the body 21 permits inward deformation of the body 21, thus maintaining a tight seal in the opening 7, while still permitting relatively easy removal of the closure member 13. It is unnecessary to provide a corresponding thread in the opening 7, inasmuch as the resiliency of the material of the plug body 21 permits deformation to accommodate the thread to the opening.

It will be seen from an examination of Figure 4 that the ring member 26 forms an annular, inwardly facing, undercut groove at the bottom of the bowl 15. The base member 11, which is also constructed of relatively soft rubber or synthetic rubber, has formed therein an overhanging flange-like member 27, which is positioned and adapted to be received in the groove between the ring 26 and the bottom of the jacket 15. Due to the deformable nature of the base member 11, the latter may be snapped into place in the ring 26, yet is removable if such removal is desired. The bottom surface of the base member 11 is formed with a downwardly facing concavity 28 so that by placing the utensil 10 on a smooth, flat surface and pressing downwardly thereon, the entire device may be made to adhere to the surface by the vacuum created in the concavity 28.

Thus, it will be seen that a utensil is provided which is readily disassembled or assembled, should it become necessary to replace any of the parts thereof, and in which the closure member 13 may be readily inserted or removed by a screwing or unscrewing rotation thereof.

While the device shown and described herein is fully capable of achieving the objects and providing the advantages hereinbefore stated, it will be realized that it is capable of considerable modification without departing from the spirit of the invention. For this reason, I do not mean to be limited to the form shown and described, but rather to the scope of the appended claims.

I claim:

1. In a food dish of the class described: a food container having a food-receiving bowl with an outwardly extending flange formed at the top edge thereof, the periphery of said flange having a downwardly and outwardly sloping conical surface; a bowl-shaped jacket spaced from said container and surrounding the same, said jacket having a substantially vertical top edge portion and an internal shoulder formed below said edge portion whereby to support said container with said flange resting on said shoulder; and a ring-shaped gasket secured to said jacket edge portion, said gasket having a re-entrantly sloped inner surface substantially congruent to, and in contact with said conical surface and being compressed between said jacket and conical surface whereby to removably retain said flange against said shoulder and provide a water-tight joint at said periphery.

2. The construction of claim 1 further characterized by having an opening formed in said flange whereby to introduce a fluid into the space between said container and jacket.

3. In a food dish of the class described: a bowl-shaped jacket having a circular bottom and a substantially vertical top edge portion; a food container within said jacket having its side walls inwardly spaced therefrom and having an outwardly extending flange at the top edge thereof; a resilient gasket radially compressed between said top edge portion of said jacket and the periphery of said flange whereby to removably retain said container in said jacket; a bezel-like ring secured to the bottom of said jacket whereby to form an inwardly facing annular groove; and a downwardly facing suction cup base substantially equal in diameter to the bottom of said jacket and having a boss with an outward flange integrally formed in the upper surface thereof, said flange being received in said groove whereby to removably secure said base to said jacket.

4. A hot food dish of the class described comprising in combination: a food container having a food-receiving bowl with an outwardly extending flange formed at the top edge thereof, the periphery of said flange having a downwardly and outwardly sloping conical surface and said flange having an inwardly flared opening formed therethrough; a bowl-shaped jacket spaced from said container and surrounding the same, said jacket having a substantially vertical top edge portion and an internal shoulder formed below said edge portion whereby to support said container with said flange resting on said shoulder; a ring-shaped gasket having an inverted U-shaped cross-section positioned with the arms of said U straddling said top edge portion of said jacket, the inner arm of said gasket being tapered outwardly substantially congruent with said conical surface and in pressure contact therewith whereby to removably retain said flange against said shoulder and provide a water-tight seal at said periphery; a bezel-like ring secured to the bottom of said jacket whereby to form an inwardly facing annular groove; a downwardly facing suction cup base having a resilient flange formed in the upper surface thereof and received in said groove whereby to removably secure said base to said jacket; and a tapered, hollow closure member of resilient material in said opening, said closure member having an external helical thread integrally formed therewith whereby to facilitate removal of said member by twisting the same.

5. In a food dish of the class described: a food container having a food-receiving bowl with an outwardly extending flange formed at the top edge thereof; a bowl-shaped jacket member spaced from said container and surrounding the same, said jacket member having a substantially vertical top edge portion, and an internal shoulder below said top edge adapted to support said container by said flange; and a ring-shaped gasket secured to said top edge portion and having a portion of downwardly converging wedge-shaped cross-section radially compressed between the same and the periphery of said flange whereby to removably retain the same against said shoulder.

6. In a food dish of the class described: a ceramic food container having a food-receiving bowl with an outwardly extending flange formed at the top edge thereof; a bowl-shaped jacket member spaced from said container and surrounding the same, said jacket member having a substantially vertical top edge portion, and an internal shoulder below said top edge adapted to support said container by said flange; and radially compressed resilient yielding means having a portion of downwardly converging wedge-shaped cross-section positioned between said edge portion and the periphery of said flange whereby to removably retain the same against said shoulder.

LORAN W. HATFIELD.

REFERENCES CITED

The following references are of record in the file of this patent:

UNITED STATES PATENTS

| Number | Name | Date |
|---|---|---|
| 797,314 | Owens | Aug. 15, 1905 |
| 1,045,101 | Wojidkow | Nov. 19, 1912 |
| 1,429,783 | Scott | Sept. 19, 1922 |
| 1,499,364 | Goodrick | July 1, 1924 |
| 1,587,874 | Strickland | June 8, 1926 |
| 1,784,516 | Fairbanks | Dec. 9, 1930 |
| 2,086,357 | Farber | July 6, 1937 |
| 2,090,182 | Burpee | Aug. 17, 1937 |
| 2,187,426 | Kuhnel | Jan. 16, 1940 |
| 2,210,183 | Schweighart | Aug. 6, 1940 |
| 2,332,173 | Shaffer | Oct. 19, 1943 |
| 2,398,060 | Van Alstyne | Apr. 9, 1946 |

FOREIGN PATENTS

| Number | Country | Date |
|---|---|---|
| 20,313 | Great Britain | Sept. 17, 1902 |
| 375,482 | Great Britain | June 30, 1932 |
| 664,424 | France | Apr. 23, 1929 |
| 830,881 | France | May 23, 1938 |
| 207,335 | Germany | Feb. 24, 1909 |